United States Patent [19]

Gautier et al.

[11] Patent Number: 5,588,346
[45] Date of Patent: Dec. 31, 1996

[54] PNEUMATIC BOOSTER

[75] Inventors: Jean Pierre Gautier; Ulysse Verbo, both of Aulnay-Sous-Bois; Miguel Perez Revilla, Argenteuil, all of France

[73] Assignee: AlliedSignal Europe Services Techniques, Drancy, France

[21] Appl. No.: 244,165

[22] PCT Filed: May 6, 1994

[86] PCT No.: PCT/FR94/00536

§ 371 Date: May 20, 1994

§ 102(e) Date: May 20, 1994

[87] PCT Pub. No.: WO94/29152

PCT Pub. Date: Dec. 22, 1994

[30] Foreign Application Priority Data

Jun. 14, 1993 [FR] France ................... 93 07121

[51] Int. Cl.$^6$ ............................................. F15B 9/10
[52] U.S. Cl. ................... 91/369.002; 91/376 R
[58] Field of Search .................. 91/369.1, 376 R

[56] References Cited

U.S. PATENT DOCUMENTS

| | | | |
|---|---|---|---|
| 4,658,704 | 4/1987 | Mori et al. | 91/376 R |
| 5,105,721 | 4/1992 | Furuta et al. | 91/376 R X |
| 5,433,135 | 7/1995 | Watanabe | 91/376 R |
| 5,976,032 | 12/1995 | Gautier et al. | 91/376 R X |

FOREIGN PATENT DOCUMENTS

| | | |
|---|---|---|
| 0035370 | 9/1981 | European Pat. Off. . |
| 3039725 | 7/1981 | Germany . |
| 2066395 | 7/1981 | United Kingdom . |

Primary Examiner—Hoang Nguyen
Attorney, Agent, or Firm—Leo H. McCormick, Jr.

[57] ABSTRACT

A pneumatic brake booster having a casing (10) with a piston located therein. The piston has a hub (22,22') with a tubular part (24,24'), a portion of which extends in a sealed fashion through the casing (10). The hub (22,22') has an annular groove (29) which receives an internal peripherial bead (19) of a rolling seal (18) which holds a skirt (16) against a shoulder. The rolling seal (18) engages the casing (10) to define a front chamber (12) which is permanently connected to a source of depression and a back chamber (14) selectively connected to the front chamber (12) and to atmosphere via valve apparatus (22a,32a,36). The valve apparatus (22a,32a,36) is actuated by a control rod (34) capable of pressing, by way of a front face on a plunger (32), on a first face of reaction disk (40) secured to a second face on a push rod (42). The tubular part (24') of the piston is connected to the hub (22) by clipping.

6 Claims, No Drawings

PNEUMATIC BOOSTER

The present invention relates to pneumatic boosters, and more particularly boosters of the type of those which are used to provide boosted braking for motor vehicles.

Boosters of this type conventionally comprise a casing inside which there is a piston including a hub extended backwards by a tubular part passing in a sealed fashion through the casing and supporting a skirt and which, with the aid of a rolling seal, defines a front chamber permanently connected to a source of depression and a back chamber selectively connected to the front chamber or to the atmosphere by a valve means actuated by a control rod capable of pressing, by means of the front face of a plunger, on a first face of a reaction disk secured by a second face to a push rod.

In such pneumatic boosters, the piston hub consists of a single-piece solid component in which the tubular part extending backwards outside the housing is extended, forwards, by a flared part on the periphery of which are mounted the skirt and the seal and in which are arranged the plunger and the reaction disk, in a configuration which is intricate to produce, taking into account in particular the communication channels and the surface finish required for the back tubular part, and has a significant overall weight.

The object of the present invention is to propose a pneumatic booster of the type defined in general above, of lighter, robust design, low manufacturing cost and which allows, simply by interchanging components of subassemblies, various adaptations suiting different vehicles provided with such boosters for assisting braking.

In order to do this, according to one feature of the invention, the back tubular part of the piston is connected to the piston hub by clipping.

Advantageously, provision may be made for the piston hub to comprise an annular groove so as to receive an internal peripheral bead of the rolling seal, the bead coming to bear on the front end of the back tubular part.

By virtue of such a design, it is possible to make provision for the back tubular part of the piston and the piston hub to consist of different materials.

In addition, with such a configuration, the body part of the hub is reduced to a core of small dimensions and low weight of compact shape giving no manufacturing problems, it being possible for the components of the piston to be assembled easily and in an automated way allowing numerous point modifications.

Other features and advantages of the present invention will emerge from the following description of one embodiment given by way of non-limiting example with reference to the appended drawing in which:

BRIEF DESCRIPTION OF THE DRAWINGS

The single FIGURE is a view in partial longitudinal section of a pneumatic booster for assisting braking. The lower half of the figure represents a conventional pneumatic booster, and the upper half represents a pneumatic booster produced in accordance with the present invention.

DETAILED DESCRIPTION OF THE DRAWINGS

By convention, the part of the booster located on the brake pedal side is called the "back" and the part located on the master cylinder side is called the "front". In the figure, the front is thus to the left and the back is to the right.

The lower half of the single figure shows the back central part of a pneumatic brake booster of the vacuum type, including a casing of which the central part of the back cover 10 can be recognized, divided internally into a front chamber, or vacuum chamber 12, and a back chamber, or working chamber 14 by a movable wall structure consisting of a skirt 16 and of a flexible seal 18 of which the external peripheral edge (not shown) is fixed in a sealed fashion between the two shells of the case.

The skirt 16 is supported by a piston 20 including a structure essentially comprising a hub part 22, and a back tubular part 24 which interacts, with sealed sliding on its periphery, with a guiding and sealing assembly 26 mounted in a back tubular central portion of the back cover 10. The hub is formed with a peripheral groove 29 receiving a bead 19 constituting the internal peripheral edge of the seal 18.

The hub 22 includes a central bore 30 in which there slides a valve plunger 32 in which there is mounted, so as to swivel, a control rod 34 of the booster, intended to be connected to a brake pedal (not represented).

The back end of the plunger 32 forms a first valve seat 32a which is concentric with a second valve seat 22a formed on the hub 22, these two valve seats being intended to interact with a valve element 36 urged elastically in the direction of the valve seats.

The operation of the booster is conventional and will be recalled only as a reminder. When the control rod 34 is actuated by the brake pedal, the plunger 32 is urged forwards and opens the passage 32a–36, thus causing air at atmospheric pressure to penetrate into the back chamber 14, by means of a radial passage 38 in the hub, the front chamber 12 being in permanent communication with a vacuum source.

A pressure differential is established between the two faces of the seal 18, giving rise to a boost force transmitted by the skirt 16 to the hub 22 of the piston. The latter bears via its annular front face 22b on the back face of a reaction disk 40, which transmits the input and boost forces to a push rod 42 actuating the piston of a master cylinder (not represented).

It can therefore be seen that the boost force created by the booster is integrally transmitted by the hub 22 of the piston, the back tubular part 24 being involved only for guiding the piston in the back part 28 of the cover 10.

In accordance with the present invention, provision is made for producing the hub of the piston and the back tubular part of the piston as two separate components, and for connecting one to the other.

As has been represented on the upper half of the single figure, the hub 22' of the piston includes a front part supporting the skirt 16 and the seal 18, and a back part, on which the valve seat 22a is formed.

To the hub 22' is attached the tubular back part 24' of the piston, the back part of which slides in a sealed fashion in the guide assembly 26, and the front part 44 of which includes means for fixing to the hub 22' of the piston.

In the example represented, these fixing means consist of a clipping-in system. The front end 46 of the tubular part 24' is of cylindrical overall shape and includes, at the front, an internal bead 8 pointing radially inwards, penetrating into a peripheral groove 50 formed on the hub 22'. Radially evenly distributed axial slits in the front end 46 may be made, so as to increase the elasticity thereof and allow it to clip in or nest over the hub 22' by an axial movement. The part of the bead 48 pointing forwards may advantageously be beveled so as to adopt a concave frustoconical shape facilitating the insertion of the tubular part 24' on the hub 22'.

Advantageously, a seal 52 will be arranged between the back tubular part 24' and the hub 22' in order to perfect sealing between the front chamber 12 and back chamber 14 of the booster.

Also advantageously, provision may be made for the groove 50, receiving the bead 48 of the tubular part 24' to be located close to the groove 29 receiving the bead 19 of the seal 18. In that way, after assembling the tubular part 24' on the hub 22', the bead 19 of the seal comes to bear radially on the front end 46 of the back tubular part 24' in order to confirm its holding on the hub 22.

It can therefore be clearly seen that, in accordance with the object of the invention, a booster has been produced in which the piston includes a hub 22' of reduced shape and volume, associated with a back tubular part 24', it being possible for these elements to be interchanged easily for maintenance operations on the booster, for modifying the characteristics of the booster, or for making use of more elaborate valve means.

On the other hand, the back tubular part and the hub could consist of different materials, the hub from a material which is chosen to have a good propensity for transmitting the force from the piston skirt to the reaction disk, and the back tubular part from a material chosen for its good propensity for sliding and for sealing with the assembly 26.

We claim:

1. A pneumatic brake booster including a casing having a piston with a hub, said hub having a tubular part a portion of which extends backwards and passes in a sealed fashion through said casing, said hub supporting a skirt and including an annular groove for receiving an internal peripheral bead of a rolling seal, said rolling seal defining a front chamber in said casing which is permanently connected to a source of vacuum and a back chamber which is selectively connected to the front chamber and to the atmosphere in response to an input force applied by a front face of a plunger, on a reaction disk secured by a second face on a push rod, characterized in that said tubular part of the piston has a front end having a bead which penetrates into a peripheral groove formed on said hub, said tubular part being permanently connected to said hub by clipping.

2. The pneumatic brake booster according to claim 1, characterized in that said front end of said tubular part includes radially evenly distributed axial slits that extend into said peripherial groove in said hub.

3. The pneumatic brake booster according to claim 2, characterized in that said peripheral groove for receiving the front end of said back tubular part is located close to said annular groove for receiving said bead of the rolling seal.

4. The pneumatic booster according to claim 3, characterized in that said internal peripheral bead of the rolling seal comes to bear radially on the front end of said tubular part.

5. The pneumatic booster according to claim 1, further characterized in that a seal is arranged between said tubular part and said hub.

6. The pneumatic booster according to claim 1, further characterized in that said tubular part of the piston and said hub consist of different materials.

* * * * *